United States Patent
Chance

(10) Patent No.: US 9,629,500 B2
(45) Date of Patent: Apr. 25, 2017

(54) REVERSIBLE, RAISED COOKING SURFACE AND HEAT DEFLECTOR

(71) Applicant: Michael Chance, Suwanee, GA (US)

(72) Inventor: Michael Chance, Suwanee, GA (US)

( * ) Notice: Subject to any disclaimer, the term of this patent is extended or adjusted under 35 U.S.C. 154(b) by 127 days.

(21) Appl. No.: 14/742,963

(22) Filed: Jun. 18, 2015

(65) Prior Publication Data

US 2016/0367075 A1 Dec. 22, 2016

(51) Int. Cl.
*A47J 27/00* (2006.01)
*A47J 37/06* (2006.01)

(52) U.S. Cl.
CPC ..................... *A47J 37/06* (2013.01)

(58) Field of Classification Search
CPC  A47J 27/00; A47J 27/002; A47J 27/02; A47J 36/34; A47J 37/049; A47J 37/06; A47J 37/0652; A47J 37/067; A47J 37/10; A47J 2037/0617
USPC .......................................... 99/422, 444, 445
See application file for complete search history.

(56) References Cited

U.S. PATENT DOCUMENTS

| | | | |
|---|---|---|---|
| 1,732,554 A * | 10/1929 | Detwiler | A47J 36/36 126/376.1 |
| 3,344,735 A | 10/1967 | Kochman | |
| 5,973,303 A | 10/1999 | Kuse | |
| 2009/0184228 A1* | 7/2009 | Lion | A47J 36/34 248/346.01 |
| 2010/0050884 A1 | 3/2010 | Leikam et al. | |
| 2011/0067581 A1 | 3/2011 | Janocha | |
| 2012/0180674 A1* | 7/2012 | Lewis | A47J 37/0694 99/445 |
| 2012/0199016 A1 | 8/2012 | Droese | |
| 2012/0318149 A1 | 12/2012 | Ahmed | |

* cited by examiner

*Primary Examiner* — Dana Ross
*Assistant Examiner* — Brandon Harvey
(74) *Attorney, Agent, or Firm* — J. T. Hollin, Attorney at Law, P.C.

(57) ABSTRACT

The inventive concept presents a device and method to better provide cooking options to a user of an outdoor cooking grill. The disclosed "Plate Setter" is a reversible, circular plate-like structure having three legs integral to, and spaced symmetrically about, the circumference of the Plate Setter. The reversible structure is characterized by two integral, back-to-back cooking surfaces. Disclosed is a first cooking surface consisting of a plurality of parallel, raised ribs elevated above a walled, circular plate bed. The second cooking surface comprises a flat cooking surface reversible from, and precisely opposite to the first cooking surface. The second cooking surface further consists of three raised beams which intersect at a common point on the surface of the second cooking surface. The raised beams provide structural strength and also partition the second cooking surface into three equal cooking sections.

4 Claims, 3 Drawing Sheets

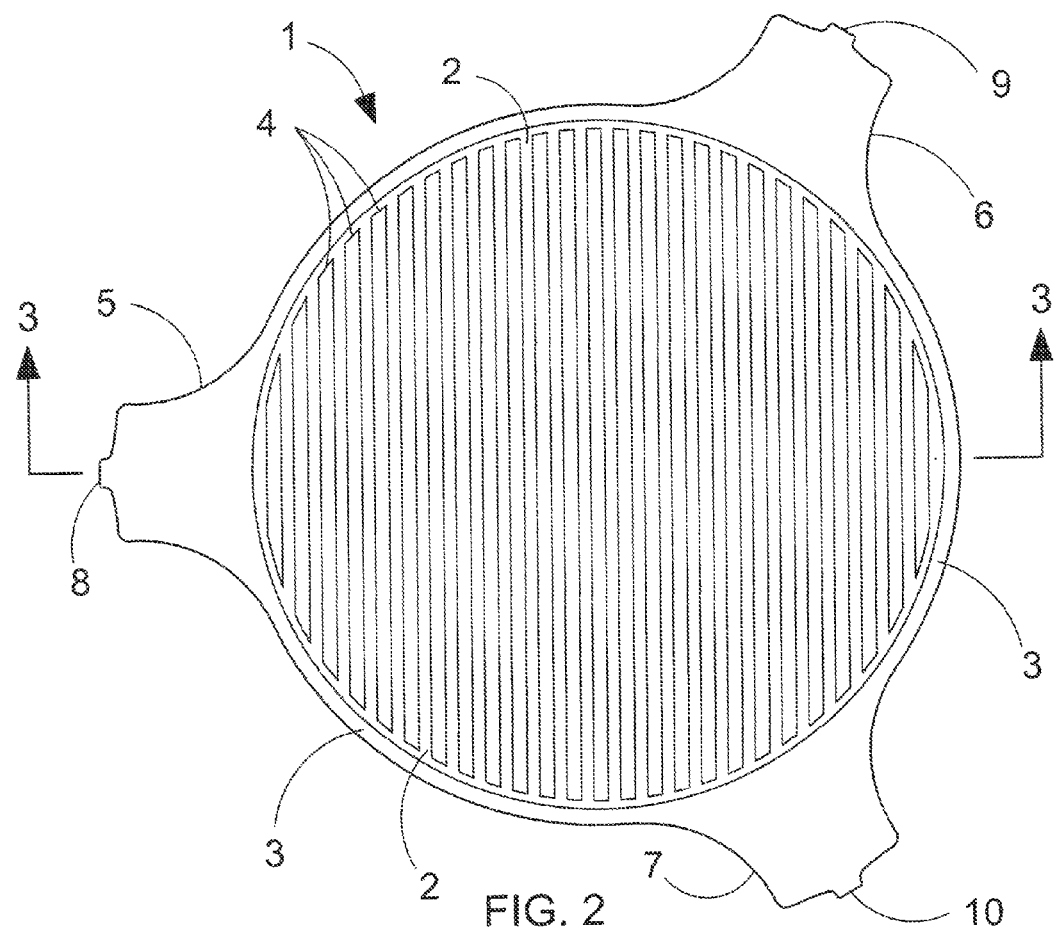
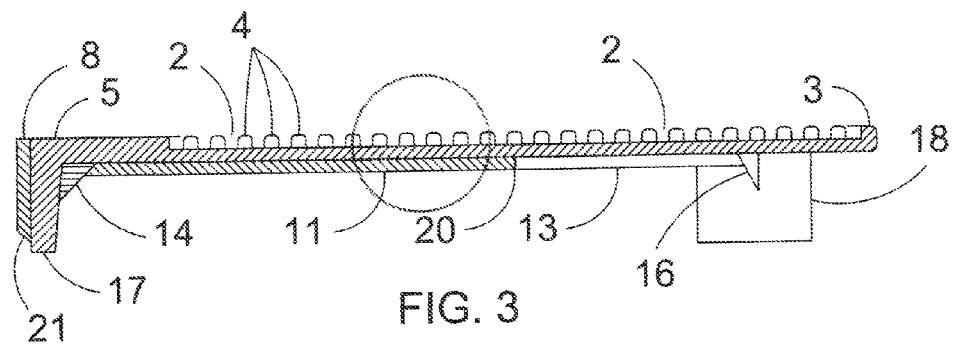

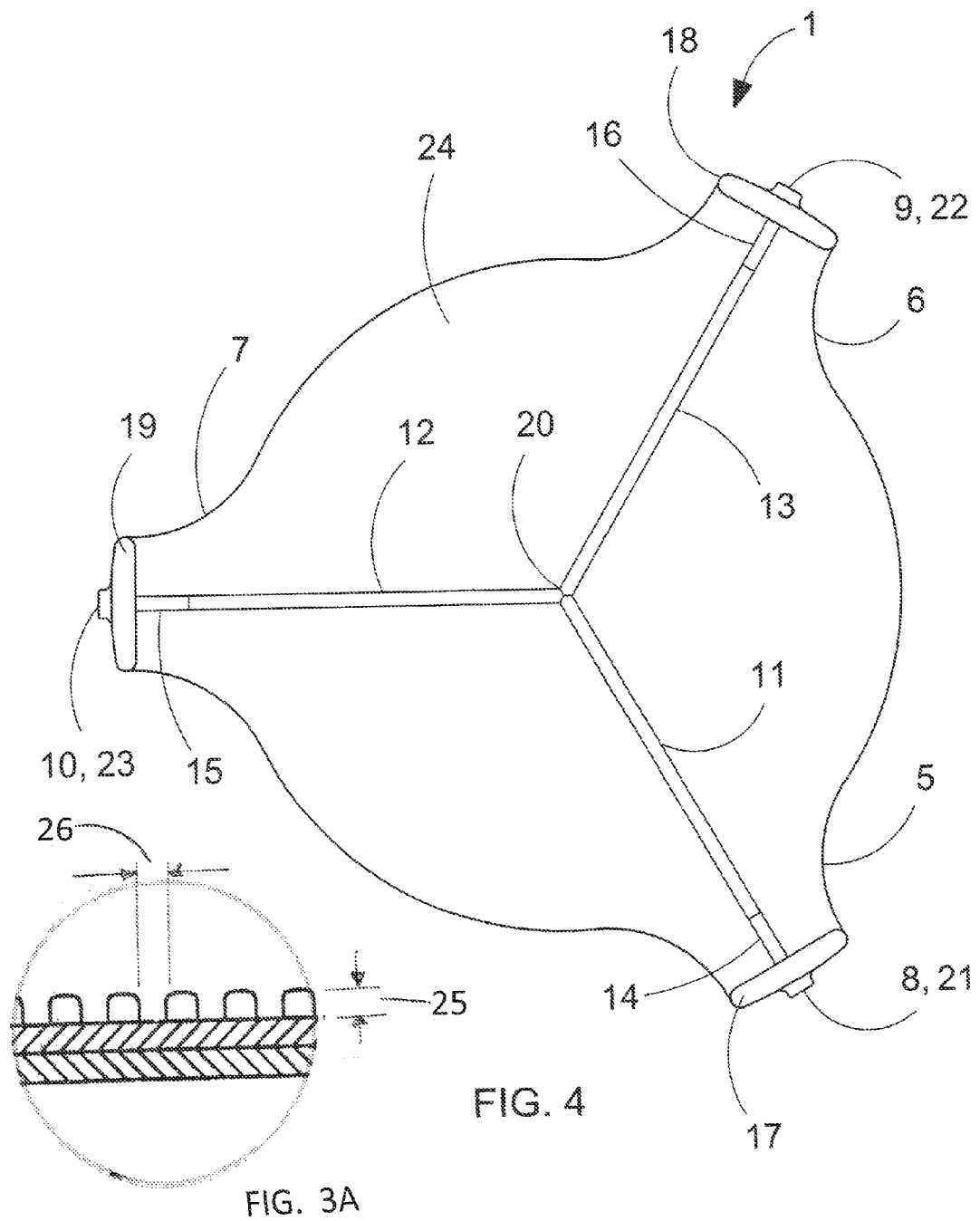

REVERSIBLE, RAISED COOKING SURFACE AND HEAT DEFLECTOR

CROSS-REFERENCES TO RELATED APPLICATIONS

None

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The disclosed inventive concept, entitled a "Plate Setter," relates in general to grilling plates, hot plates, stone plates, or similar structures which may be used to heat or prepare food items. These type structures include those heating or grilling plates which may be connected to an electrical heating element or may be placed directly atop a stove, fireplace or other source of heat which generates temperatures high enough to grill, braise, bake, or fry food items.

(2) Description of the Related Art, Including Information Disclosed Under 37 CFR 1.97 and 1.98

US #2012/0318149 A1 (Dec. 20, 2012) Disclosed is a cooking grate and a grill assembly having one or more of the cooking grates therein. The cooking grate can be a one-piece structure but is preferably a two-piece structure wherein the upper piece comprises longitudinally extending food support ribs having hollow interiors. The ribs will be positioned over and cover open areas in the lower structure so that combustion gases flowing through the open areas of the lower structure will flow into the hollow interiors of the food support ribs.

US #2012/0199016 A1 (Aug. 9, 2012) A griddle pan which comprises a pan body having sides and an inside bottom defining a perimeter at which the sides protrude upward from the inside bottom. The inside bottom has a center and an upper face on which protrude upwardly rising ribs upon which food to be grilled is laid. The ribs have outside ends disposed at a distance from the sides. The ribs have upper surfaces all lying in a same horizontal, non-curvilinear plane and define intervening spaces therebetween.

US #2011/0067581 A1 (Mar. 24, 2011) A griddle top for the fast griddling of foods, includes a grill plate, which is disposed on a grill or another heat source, and in which a plurality of grooves are formed, the channels including three approximately flat strips, which are connected at their longitudinal edges to form an upwardly open profile, with at least one piece of food being in contact on at least two mutually spaced, elongated portions of its outer skin, or surface, with one of the three strips of a channel.

US #2010/0050884 A1 (Mar. 4, 2010) Disclosed is a grilling plate, which is divided into different sections, wherein at least a part of the sections is connected to a heating element. To better maintain different temperatures in different sections, the invention grilling plate comprises a plate forming the top side of it and extending uniformly along all sections, wherein the sections are divided by at least one groove being arranged in the bottom side of the plate.

U.S. Pat. No. 4,979,440 (Dec. 25, 1990) A barbecue grill insert that consists of a plate with a raised rim that is fabricated out of disposable heavy duty heat resistant material. The plate is perforated and when placed upon a permanent cooking grid of the barbecue grill will protect the grid from fluids coming from food thereon. The insert can be properly positioned on the bars of the cooking grid so that the fluids from the food will drip down between the bars through the perforations in the plate.

U.S. Pat. No. 3,385,357 (May 28, 1968) A combined heated tray and carving board structure is disclosed. The tray has a plurality of ribs which are adapted to fit correspondingly spaced grooves in the carving board. This board is adapted to be located at various locations along the length of the tray by certain of the ribs engaging the grooves in the cutting block or board, thus inhibiting motion of the cutting block along the length of the tray.

U.S. Pat. No. 3,344,735 (Oct. 3, 1967) A griddle-hot plate adapted to be used with either flat surface thereof facing a heat source and the opposite surface thereof providing direct or indirect cooking surface. The hot plate flat surface has a circumferential groove therearound, and an opposite surface which is substantially flat, at least one continuous rib wall substantially centrally disposed; and a multiplicity of legs extending from said surface. The centrally disposed rib wall is inserted into a center opening of a gas burner and the legs are adapted to insert through grid arms usually found in either gas or electrical ranges.

BRIEF SUMMARY OF THE INVENTION

To better provide cooking options to a user of an outdoor cooking grill or other heat source, the disclosed Plate Setter comprises a reversible, circular, plate-like structure having three legs integral to, and spaced symmetrically about, the circumference of the Plate Setter. This reversible structure is characterized in that the Plate Setter consists of two back-to-back horizontally-oriented cooking surfaces. The first cooking surface consists of a plurality of parallel, raised ribs elevated above a circular plate bed. By reversing the horizontal orientation of the first cooking surface, the second cooking surface is exposed. The second cooking surface comprises a flat cooking surface reversibly integral to the first surface and further comprises three beams which, in addition to providing structural strength, also partition the second cooking surface into three equal sections.

BRIEF DESCRIPTION OF THE VIEWS OF THE DRAWINGS

FIG. 2 depicts a direct overhead view of the Plate Setter 1 with a section line 3-3 displayed.

FIG. 3 shows a cross-sectional view of the Plate Setter 1 as seen from the perspective of section line 3-3.

FIG. 3A presents an inset of the cross section view of the Plate Setter 1, showing the height of the ribs and the spacing between adjacent ribs.

FIG. 4 is a view of the Plate Setter second cooking surface 24.

DETAILED DESCRIPTION OF THE INVENTION

Figure 1:
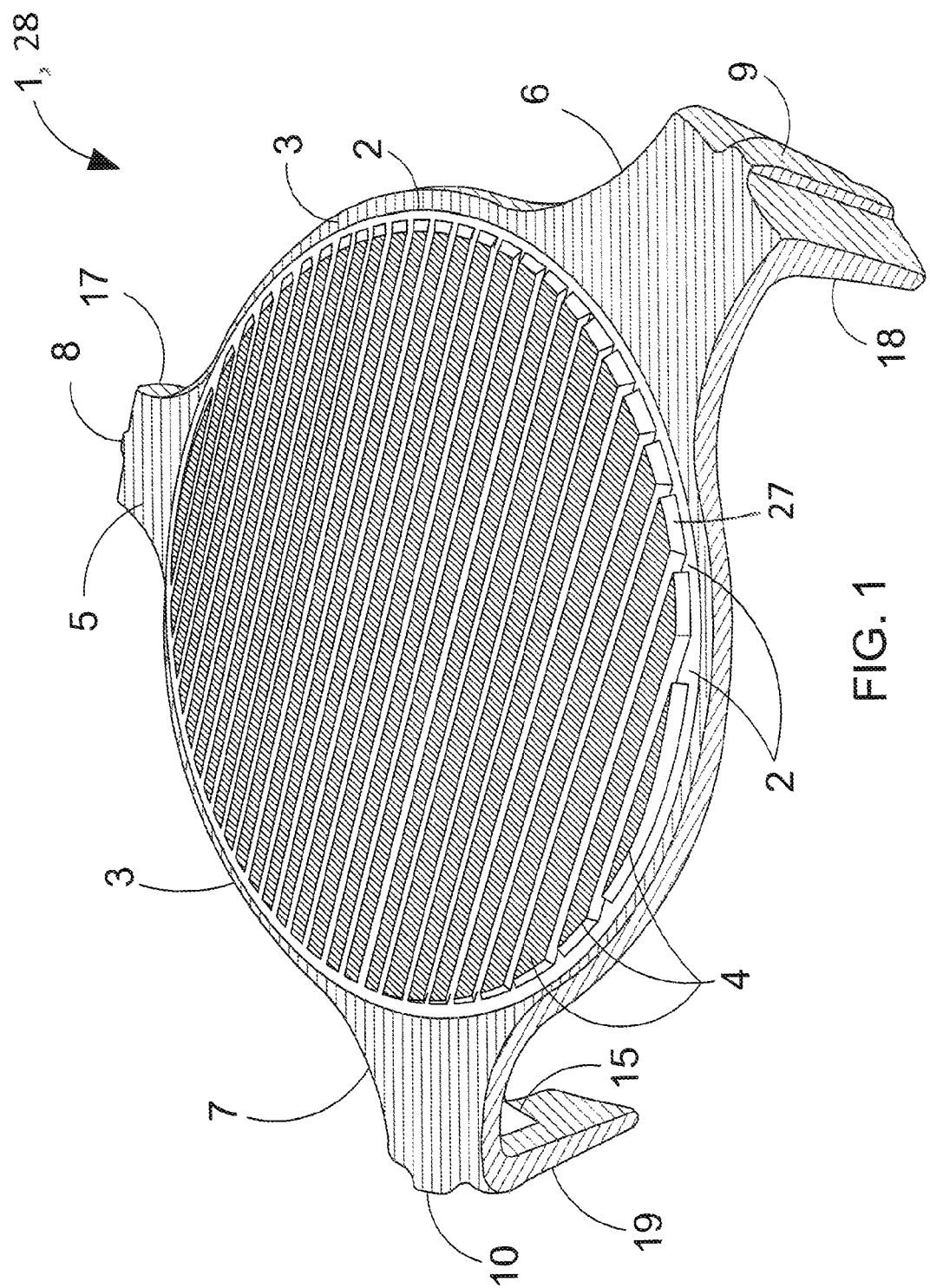
FIG. 1 is a three-dimensional perspective view of the first cooking surface of the Plate Setter 1 in the cooking position obtained with the three legs turned downward.

The objects, features, and advantages of the concept presented in this application are more readily understood when referring to the accompanying drawings. The drawings, totaling five figures, show the basic components and functions of embodiments and/or methods of use. In the several figures, like reference numbers are used in each figure to correspond to the same component as may be depicted in other figures.

The discussion of the present inventive concept will be initiated with FIG. 1, which illustrates the Plate Setter 1 positioned in a cooking arrangement which allows a user to prepare foods on the first cooking surface 28. The first cooking surface 28 is essentially a circular plate comprising a plurality of parallel, evenly-spaced ribs 4 elevated above a circular plate bed 2. Each of the ribs 4 is beveled 27 at both ends. A raised perimeter 3 circles and encloses the plate bed 2 at a constant distance from the bevels 27 of the rib 4. At three symmetrically-spaced locations along the raised perimeter 3, a first wing 5, a second wing 6, and a third wing 7 extend horizontally outward from, and parallel to the upper surface of the raised perimeter 3. Each of the three wings 5, 6, 7 forms an orthogonal, downward bend, causing the formation of a vertically-oriented first leg 17, a vertically-oriented second leg 18, and a vertically-oriented third leg 19.

Each leg 17, 18, 19 respectively manifests an outer face having a protruding, centered, vertical first ridge 8, a second ridge 9, and a third ridge 10, on each respective leg. Each leg 17, 18, 19 further comprises an inner face having a forty-five degree first brace 14, a second brace 15, and a third brace 16, respectively. The vertical ridges 8, 9, 10 and braces 14, 15, 16 are more readily apparent in FIG. 3 and FIG. 4. The bottommost segment of each leg 17, 18, 19 also features a bevel 21, 22, 23, more easily seen in FIG. 3 and FIG. 4. The vertical ridges 8, 9, 10, serve to provide added strength and rigidity to each respective leg 5, 6, 7. The forty-five degree braces 14, 15, 16 also correspondingly serve to provide added strength and support to each leg 5, 6, 7, respectively, and to the entire Plate Setter 1.

FIG. 2 presents a downward looking view of the Plate Setter 1, particularly the first cooking surface 28. Again it is seen the Plate Setter 1 is essentially a circular structure comprising, in the preferred embodiment, twenty-five (25) parallel, raised ribs 4 in varying lengths as they are encompassed within the circular frame of the Plate Setter 1. The linear top surfaces of the ribs 4 are elevated a certain height 25 (ref. FIG. 3A) above the plate bed 2. Individual ribs 4 are separated from each other by a certain distance 26 (ref. FIG. 3A). A raised perimeter 3 (at the same height above the plate bed 2 as the ribs 4) circles and encloses the plate bed 2 at a constant distance from the bevels 27 of the ribs 4. The three wings 5, 6, 7 are shown at three symmetrically-spaced locations around the raised perimeter 3, along with the respective ridges 8, 9, 10 extending downward. A section line 3-3 extends perpendicularly across the ribs 4 shown in FIG. 2 to indicate the direction and scope of a view seen in FIG. 3A.

FIG. 3 presents a cross-sectional view of the Plate Setter 1 as seen from the orientation of section line 3-3 in FIG. 2. The leftmost portion of FIG. 3 illustrates the mid cross-section structure of the center of the first wing 5, the first leg 17, the first ridge 8, and the first brace 14. A cross-sectional view of the ribs 4, the plate bed 2, and the right edge of the raised perimeter 3, are further shown. The circled portion of FIG. 3 is shown in larger scale in FIG. 3A.

In FIG. 3A there is shown an indication of the means of measurement of spacing 26 between consecutive parallel ribs 4 and also the height 25 of the ribs 4 above the plate bed 2. The evenly-spaced, parallel ribs 4, in the preferred embodiment, are spaced, one from the other, a distance 26 of 3/16 inch, and protrude upward from said circular plate bed 2 a height 25 of 3/16 inch. The raised perimeter 3 also protrudes a vertical rise of 3/16 inch above the plate bed 2.

FIG. 4 is a view of the Plate Setter 1 second cooking surface 24, which is integral to and back-to-back structurally to the first cooking surface 28. Shown are the bottom surfaces of the first wing 5, the second wing 6, and the third wing 7, which transition to the first leg 17, the second leg 18, and the third leg 19, respectively. Also displayed are the three integral vertical ridges 8, 9, 10, respectively of the three legs 17, 18, and 19, and the respective bevels 21, 22, 23, machined at the bottom segment of each respective vertical ridge 8, 9, 10. Further illustrated are the first brace 14, the second brace 15, and the third brace 16, and the manner in which the three braces 14, 15, 16 connect from the back end of their respective legs 17, 18, 19 to the plate beams 11, 12, 13. The three beams 11, 12, 13 protrude orthogonally outward from the second surface 24 a distance of approximately 3/16 to 1/2 inch. The three beams 11, 12, 13, intersect at a common junction 20, thereby partitioning the second surface 24 into three sections.

In the preferred embodiment, the Plate Setter 1 is most effectively used by placing the entire device inside an outdoor cooking grill, of a type similar to the Big Green Egg® such that either the first cooking surface 28 or the second cooking surface 24 is in an upward-facing, horizontal orientation within the grill. The Plate Setter 1 may be constructed in any size, shape, or combination of dimensions suitable for eventual use by a consumer.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A one-piece, integral plate setter device constructed of rigid metal, said plate setter being a reversible structure characterized by first and second back-to-back horizontally-oriented cooking surfaces for the placement and/or retention of food items upon either surface, for the cooking or warming of said food items when proximate a heat source, said device comprising:

(a) said first surface further comprising a circular plate bed having a plurality of evenly-spaced, parallel ribs, said ribs extending vertically upwards from said circular bed at a certain height; a raised perimeter circling an edge of the first surface, said raised perimeter extending vertically upwards from said circular bed a distance equal to the height of the ribs; a first wing, a second wing, and a third wing, said wings equally spaced around the first surface and extending horizontally outwards from the first surface a certain distance, whereat each wing constitutes an orthogonal downward bend to comprise three equal-length legs each leg having a front side with an integral centered vertical ridge, a back side having a forty-five degree brace, said braces being perpendicular to the first surface, and a beveled bottommost portion of the leg;

(b) said second surface, being the integral bottom of said first surface, further comprising a flat circular plate having a first beam, a second beam, and a third beam, each of said beams originating from a common junction at a center of said second surface, each beam having a same certain height above the second surface, and each beam extending linearly from the junction outward to intersect the braces existing on the back side of the first leg, the second leg, and the third leg, respectively; wherein (c) food items are prepared either by means of arrangement of the upwardly-facing, horizontal arrangement of said first surface directly proximate said heat source or, by reversing the orientation of said first surface, exposing said second surface, for preparation of food items on said second surface proximate said heat source.

2. A one-piece, integral plate setter device constructed of rigid metal, said plate setter being a reversible structure characterized by first and second back-to-back horizontally-oriented cooking surfaces for the placement and/or retention of food items upon either surface, thereby enabling the cooking or warming of said food items when proximate a heat source, said device comprising:

a circular metallic structure of a diameter 13 & ⅛ inches, and a thickness of ⅜ inch, wherein (a) said structure constituting said first surface having a circular plate bed of diameter of 12 & 3/16 inches and the circular plate bed having a plurality of evenly-spaced, parallel ribs, said ribs having a width of 3/16 inch, and extending vertically upwards from said circular bed a height of 3/16 inch, a first and second end of each rib terminating at a circular edge of said circular plate bed; a flat, raised perimeter forming a vertical rise of 3/16 inch about the circular edge of the plate bed;

a first wing, a second wing, and a third wing, said wings equally spaced around the raised perimeter and extending horizontally outwards from the raised perimeter a distance of 2 & ⅝ inches, and having a width of 2 & ⅜ inches, whereupon each wing constitutes an orthogonal downward bend to comprise three equal-length legs of 3 & ½ inches each, each leg having an outer side with an integral, centered vertical ridge, further each respective ridge having a beveled bottommost portion, an inner side of each leg further having a forty-five degree brace, said brace originating 1.0 inch from a bottom of said plate bed, being perpendicular to the second surface of said plate bed, and intersecting the inner side of each said leg; and further, wherein (b) said structure further constituting said second surface, being a bottom of said first surface, said second surface further comprising a flat circular plate of a diameter of 13 & ⅛ inches, and having a first beam, a second beam, and a third beam, each of said beams originating from a common junction at a center of said second surface, each beam having a length of 14.0 inches and a height of ¼ inch above the second surface, and each respective beam extending linearly from the junction outward to intersect the respective braces existing on the inner side of the first leg, the second leg, and the third leg, respectively.

3. A method for the preparation of food items on either of first and second reversibly-oriented surfaces common to a cooking device, each said surface used for the placement and retention of food items thereupon, for the cooking or warming of said food items by means of an upwardly-facing horizontal arrangement of either of said reversible surfaces directly above, within, or proximate a heat source, the method comprising the steps of:

providing a one-piece metal or composite material circular plate of a diameter of 13 & ⅛ inches, and a thickness of ⅜ inch, and further having said first and second reversible cooking surfaces, further providing said first surface having a circular plate bed of diameter of 12 & 3/16 inches and the circular plate bed having a plurality of evenly-spaced, parallel ribs, said ribs having a width of 3/16 inch, and extending vertically upwards from said circular bed a height of 3/16 inch, a first and second end of each rib terminating at a circular edge of said circular plate bed; a flat, raised perimeter forming a vertical rise of 3/16 inch about the circular edge of the plate bed;

providing a first wing, a second wing, and a third wing, said wings equally spaced around the raised perimeter and extending horizontally outwards from the raised perimeter a distance of 2 & ⅝ inches, and having a width of 2 & ⅜ inches, whereupon each wing constitutes an orthogonal downward bend to comprise three respective equal-length legs of 3 & ½ inches each, each leg having an outer side with an integral, centered vertical ridge, farther each respective ridge having a beveled bottommost portion, an inner side of each leg farther having a forty-five degree brace, said brace originating 1.0 inch from the bottom surface of said plate bed, being perpendicular to the bottom surface of said plate bed, and intersecting the inner side of each said leg; and further, wherein providing said second surface, being a bottom of said first surface, said second surface further comprising a flat circular plate of a diameter of 13 & ⅛ inches, and having a first beam, a second beam, and a third beam, each of said beams originating from a common junction at a center of said second surface, each beam having a length of 14.0 inches and a height of ¼ inch above the second surface, and each respective beam extending linearly from the junction outward to intersect the respective braces existing on the inner side of the first leg, the second leg, and the third leg, respectively; and cooking or warming of food items arranged upon said first surface by means of the horizontal arrangement of said first surface directly above, within, or proximate said heat source or, by reversing the horizontal orientation of said first surface, exposing said second surface for the placement and retention of food items thereupon, cooking or warming of said food items by means of the horizontal arrangement of said second surface directly above, within, or proximate said heat source.

4. An improved food preparation and outdoor cooking device for use conjunction with a heat source, the improvement comprising a one-piece, circular plate setter device constructed of rigid metal, said plate setter having a first, or top, surface used for a placement and retention of food items thereupon, for cooking or warming of said food items by means of a horizontal arrangement of said first surface directly above, within, or proximate said heat source and, by reversing the horizontal arrangement of said first surface, exposing a second, or bottom, surface, said second surface also used for a placement and retention of food items thereupon, for the cooking or warming of said food items by means of a horizontal arrangement of said second surface directly above, within, or proximate said heat source, said plate setter comprising:

a circular metallic structure of a diameter of 13 & 1/8 inches, and a thickness of 3/8 inch, wherein (a) said structure forms the first surface having a circular plate bed of diameter of 12 & 3/16 inches and the circular plate bed having a plurality of evenly-spaced, parallel ribs, said ribs having a width of 3/16 inch, and extending vertically upwards from said circular bed a height of 3/16 inch, a first and second end of each rib terminating at a circular edge of said circular plate bed; a flat, raised perimeter forming a vertical rise of 3/16 inch about the circular edge of the plate bed;

a first wing, a second wing, and a third wing, said wings equally spaced around the raised perimeter and extending horizontally outwards from the raised perimeter a distance of 2 & 5/8 inches, and having a width of 2 & 3/8 inches, whereupon each wing constitutes an orthogonal downward bend to comprise three respective equal-length legs of 3 & 1/2 inches each, each leg having an outer side with an integral, centered vertical ridge, further each respective ridge having a beveled bottommost portion, an inner side of each leg further having a forty-five degree brace, said brace originating 1.0 inch from the bottom surface of said plate bed, being perpendicular to the bottom surface of said plate be and intersecting the inner side of each said leg; and further, wherein said structure forms said second surface, being a bottom of said first surface, said second surface further comprising a flat circular plate of a diameter of 13 & 1/8 inches, and having a first beam, a second beam, and a third beam, each of said beams originating from a common junction at a center of said second surface, each beam having a length of 14.0 inches and a height of 1/4 inch out from the second surface, and each respective beam extending linearly from the junction outward to intersect the respective braces existing on the inner side of the first leg, the second leg, and the third leg, respectively.

\* \* \* \* \*